US011505178B2

(12) United States Patent
Yamanaka et al.

(10) Patent No.: US 11,505,178 B2
(45) Date of Patent: Nov. 22, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hiroshi Yamanaka, Wako (JP); Yoshitaka Mimura, Wako (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 366 days.

(21) Appl. No.: 16/815,036

(22) Filed: Mar. 11, 2020

(65) Prior Publication Data

US 2020/0290601 A1 Sep. 17, 2020

(30) Foreign Application Priority Data

Mar. 15, 2019 (JP) .............................. JP2019-048141

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/20* (2013.01);
(Continued)

(58) Field of Classification Search
CPC ...... B60W 30/06; B60W 10/04; B60W 10/20; B60W 50/0205; B60W 50/12; B60W 50/14; B60W 2050/021; B62D 15/0285
(Continued)

(56) References Cited

U.S. PATENT DOCUMENTS

2014/0210646 A1\* 7/2014 Subramanya .......... G08G 1/147
348/148
2014/0244095 A1\* 8/2014 Choi .................... B62D 15/029
701/25
(Continued)

FOREIGN PATENT DOCUMENTS

| JP | 2017-182263 | 10/2017 |
| JP | 2019-026067 | 2/2019 |
| WO | 2021/039406 | 3/2021 |

OTHER PUBLICATIONS

Japanese Notice of Allowance for Japanese Patent Application No. 2019-048141 dated Jun. 14, 2022.
(Continued)

*Primary Examiner* — Jonathan M Dager
*Assistant Examiner* — Jean W Charleston
(74) *Attorney, Agent, or Firm* — Amin, Turocy & Watson, LLP

(57) ABSTRACT

A vehicle control device includes a communicator configured to communicate with a parking lot management device having a function of guiding a vehicle, a driving controller configured to perform driving control including at least one of speed control and steering control of the vehicle, and an abnormality determiner configured to determine the presence or absence of an abnormality in the parking lot management device. The driving controller is configured to perform the driving control based on guidance of the parking lot management device on the basis of information received by the communicator from the parking lot management device and to restrict the driving control based on the guidance of the parking lot management device in a case where the abnormality determiner determines that the abnormality has occurred in the parking lot management device.

11 Claims, 7 Drawing Sheets

(51) Int. Cl.
  *B60W 50/14* (2020.01)
  *B60W 10/20* (2006.01)
  *B60W 50/02* (2012.01)
  *B60W 50/12* (2012.01)
(52) U.S. Cl.
  CPC ........ *B60W 50/0205* (2013.01); *B60W 50/12* (2013.01); *B60W 50/14* (2013.01); *B60W 2050/021* (2013.01)
(58) Field of Classification Search
  USPC .......................................................... 701/23
  See application file for complete search history.

(56) References Cited

U.S. PATENT DOCUMENTS

| | | | |
|---|---|---|---|
| 2017/0021828 A1* | 1/2017 | Seo | B60W 10/182 |
| 2017/0226764 A1* | 8/2017 | Nussbaum | E04H 6/22 |
| 2017/0285654 A1* | 10/2017 | Nagai | B60W 30/06 |
| 2019/0213883 A1* | 7/2019 | Kim | G08G 1/141 |
| 2019/0283736 A1* | 9/2019 | Watanabe | B60W 30/06 |
| 2020/0050212 A1* | 2/2020 | Mimura | B60W 30/0956 |
| 2020/0070815 A1* | 3/2020 | Ko | G08G 1/148 |
| 2020/0148196 A1* | 5/2020 | Lim | G08G 1/0125 |
| 2020/0183384 A1* | 6/2020 | Noh | H04W 4/024 |

OTHER PUBLICATIONS

Japanese Office Action for Japanese Patent Application No. 2019-048141 dated Apr. 26, 2022.

* cited by examiner

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2019-048141, filed Mar. 15, 2019, the contents of which are hereby incorporated by reference into the present application.

BACKGROUND OF THE INVENTION

Field of the Invention

The present invention relates to a vehicle control device, a vehicle control method, and a storage medium.

Description of Related Art

In recent years, research has been conducted on automatedly controlling vehicles. An automated valet parking device for communicating with an automated driving vehicle, guiding the automated driving vehicle to an empty space within a parking lot attached to a facility, and causing the automated driving vehicle to be automatedly parked within the empty space by applying the above research is known (for example, see Japanese Unexamined Patent Application, First Publication No. 2017-182263).

SUMMARY OF THE INVENTION

However, in the related technology, the automated driving vehicle cannot be guided when an abnormality such as a power failure has occurred in a device for guiding a vehicle in valet parking and situations in which an automated driving vehicle cannot be guided have not been sufficiently studied.

The present invention has been made in view of such circumstances and an objective of the present invention is to provide a vehicle control device, a vehicle control method, and a storage medium capable of solving problems to be taken into account when an abnormality has occurred in a device that guides a vehicle in valet parking.

A vehicle control device, a vehicle control method, and a storage medium according to the present invention adopt the following configurations.

(1): A vehicle control device according to an aspect of the present invention includes: a communicator configured to communicate with a parking lot management device having a function of guiding a vehicle; a driving controller configured to perform driving control including at least one of speed control and steering control of the vehicle; and an abnormality determiner configured to determine the presence or absence of an abnormality in the parking lot management device, wherein the driving controller is configured to perform the driving control based on guidance of the parking lot management device on the basis of information received by the communicator from the parking lot management device and to restrict the driving control based on the guidance of the parking lot management device in a case where the abnormality determiner determines that the abnormality has occurred in the parking lot management device.

(2): In the above-described aspect (1), in a case where the abnormality has occurred in the parking lot management device before the vehicle enters a parking lot managed by the parking lot management device, the driving controller is configured to restrict acceptance of a request of automated parking based on the guidance of the parking lot management device from a user of the vehicle and to perform control for manual driving by the user of the vehicle or control for enabling the vehicle to perform automated driving in an independent manner independently of the guidance of the parking lot management device.

(3): In the above-described aspect (1) or (2), in a case where the abnormality has occurred in the parking lot management device after the vehicle entered a parking lot managed by the parking lot management device, the driving controller is configured to restrict acceptance of a request of automated exiting based on the guidance of the parking lot management device from a user of the vehicle and to perform control for manual driving by the user of the vehicle or control for enabling the vehicle to perform automated parking or the automated exiting in an independent manner independently of the guidance of the parking lot management device.

(4): In the above-described aspect (1) or (2), in a case where the abnormality has occurred in the parking lot management device after the vehicle entered a parking lot managed by the parking lot management device, the driving controller is configured to restrict acceptance of a request of automated exiting based on the guidance of the parking lot management device from a user of the vehicle during automated parking based on the guidance of the parking lot management device and to perform control for enabling the vehicle to perform the automated parking in an independent manner independently of the guidance of the parking lot management device, the driving controller is configured to restrict the acceptance of the request of the automated exiting based on the guidance of the parking lot management device from the user of the vehicle while the vehicle is on standby in the parking lot, and the driving controller is configured to restrict the acceptance of the request of the automated exiting based on the guidance of the parking lot management device from the user of the vehicle during the automated exiting based on the guidance of the parking lot management device and to perform control for manual driving by the user of the vehicle or control for enabling the vehicle to perform the automated exiting in the independent manner independently of the guidance of the parking lot management device.

(5): In any one of the above-described aspects (1) to (4), in a case where the abnormality has occurred in the parking lot management device during automated parking or automated exiting based on the guidance of the parking lot management device, the driving controller is configured to stop the automated exiting based on the guidance of the parking lot management device and to perform control for enabling the vehicle to perform the automated parking in an independent manner independently of the guidance of the parking lot management device in an evacuation space.

(6): In the above-described aspect (5), the driving controller is configured to determine an empty parking space nearest to the vehicle or an empty road shoulder nearest to the vehicle as the evacuation space.

(7): In the above-described aspect (5) or (6), the driving controller is configured to determine the evacuation space in an area away from an area where traffic congestion occurs in a case where the traffic congestion occurs in the vicinity of the vehicle.

(8): In any one of the above-described aspects (1) to (7), the abnormality determiner is configured to determine that the abnormality has occurred in the parking lot management device in a case where the communicator is unable to communicate with the parking lot management device or in a case where the parking lot management device is unable to guide the vehicle in a state in which the communicator is able to communicate with the parking lot management device.

(9): In any one of the above-described aspects (1) to (8), the vehicle control device further includes a notification controller configured to control an output to notify a user of the vehicle of a restriction in a case where control for automated parking or automated exiting based on the guidance of the parking lot management device is restricted.

(10): In any one of the above-described aspects (1) to (9), the driving controller is configured to perform control for automated parking and automated exiting of the vehicle in a case where the abnormality determiner determines that the abnormality of the parking lot management device has been eliminated.

(11): A vehicle control method using a vehicle computer according to an aspect of the present invention includes: communicating with a parking lot management device for guiding a vehicle; performing driving control including at least one of speed control and steering control of the vehicle; determining the presence or absence of an abnormality in the parking lot management device; performing the driving control based on guidance of the parking lot management device on the basis of information received from the parking lot management device; and restricting the driving control based on the guidance of the parking lot management device in a case where it is determined that the abnormality has occurred in the parking lot management device.

(12): A computer-readable non-transitory storage medium according to an aspect of the present invention stores a program for causing a vehicle computer to: communicate with a parking lot management device for guiding a vehicle; perform driving control including at least one of speed control and steering control of the vehicle; determine the presence or absence of an abnormality in the parking lot management device; perform the driving control based on guidance of the parking lot management device on the basis of information received from the parking lot management device; and restrict the driving control based on the guidance of the parking lot management device in a case where it is determined that the abnormality has occurred in the parking lot management device.

According to (1) to (12), it is possible to solve problems to be taken into account when an abnormality has occurred in a device for guiding a vehicle in valet parking.

DETAILED DESCRIPTION OF THE INVENTION

Embodiments of a vehicle control device, a vehicle control method, and a storage medium of the present invention will be described below with reference to the drawings.

Overall Configuration

Figure 1:
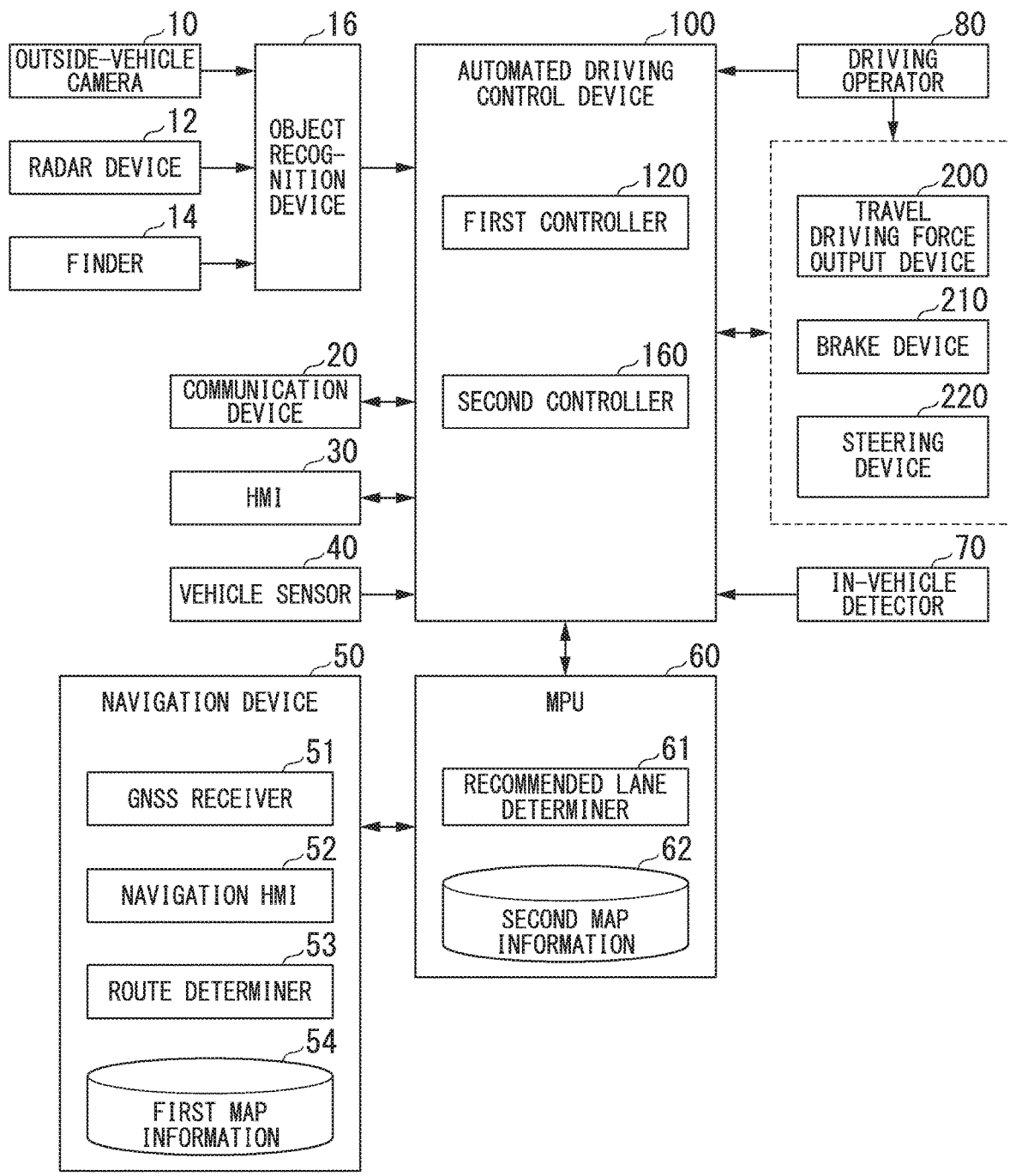
FIG. 1 is a configuration diagram of a vehicle system using a vehicle control device according to an embodiment.

FIG. 1 is a configuration diagram of a vehicle system 1 using a vehicle control device according to an embodiment. A vehicle equipped with the vehicle system 1 is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

For example, the vehicle system 1 includes an outside-vehicle camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the outside-vehicle camera 10 is a digital camera using a solid-state imaging element such as a charge coupled device (CCD) or a complementary metal oxide semiconductor (CMOS). The outside-vehicle camera 10 is attached to any position on the vehicle (hereinafter, a host vehicle M) in which the vehicle system 1 is mounted. When the view in front of the host vehicle M is imaged, the outside-vehicle camera 10 is attached to an upper part of a front windshield, a rear surface of a rearview mirror, or the like. For example, the outside-vehicle camera 10 periodically and iteratively images the surroundings of the host vehicle M. The outside-vehicle camera 10 may be a stereo camera or a 360-degree camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The object recognition device 16 performs a sensor fusion process on detection results from some or all of the outside-vehicle camera 10, the radar device 12, and the finder 14 to recognize a position, a type, a speed, and the like of a physical object. The object recognition device 16 outputs recognition results to the automated driving control device 100. The object recognition device 16 may output detection results of the outside-vehicle camera 10, the radar device 12, and the finder 14 to the automated driving control device 100 as they are. The object recognition device 16 may be omitted from the vehicle system 1.

The communication device 20 communicates with another vehicle or a parking lot management device (to be described below) present in the vicinity of the host vehicle M or various types of server devices using, for example, a cellular network or a Wi-Fi network, Bluetooth (registered trademark), dedicated short range communication (DSRC), or the like.

The HMI 30 presents various types of information to the occupant of the host vehicle M and accepts an input operation of the occupant. The HMI 30 includes various types of display devices, a speaker, a buzzer, a touch panel, a switch, keys, and the like. The HMI 30 may accept an instruction from a user according to a manual operation of the user or accept an instruction from the user by recognizing a sound of the user.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines what number lane the vehicle travels in from the left. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operator 80 includes an accelerator pedal, a brake pedal, a shift lever, a steering wheel, a steering wheel variant, a joystick, and other operation elements. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120 and a second controller 160. The first controller 120 and the second controller 160 are implemented, for example, by a hardware processor such as a central processing unit (CPU) executing a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by software and hardware in cooperation. The program may be pre-stored in a storage device such as an HDD or a flash memory of the automated driving control device 100 (a storage device including a non-transitory storage medium) or may be installed in the HDD or the flash memory of the automated driving control device 100 when the program is stored in a removable storage medium such as a DVD or a CD-ROM and the storage medium (the non-transitory storage medium) is mounted in a drive device.

Figure 2:
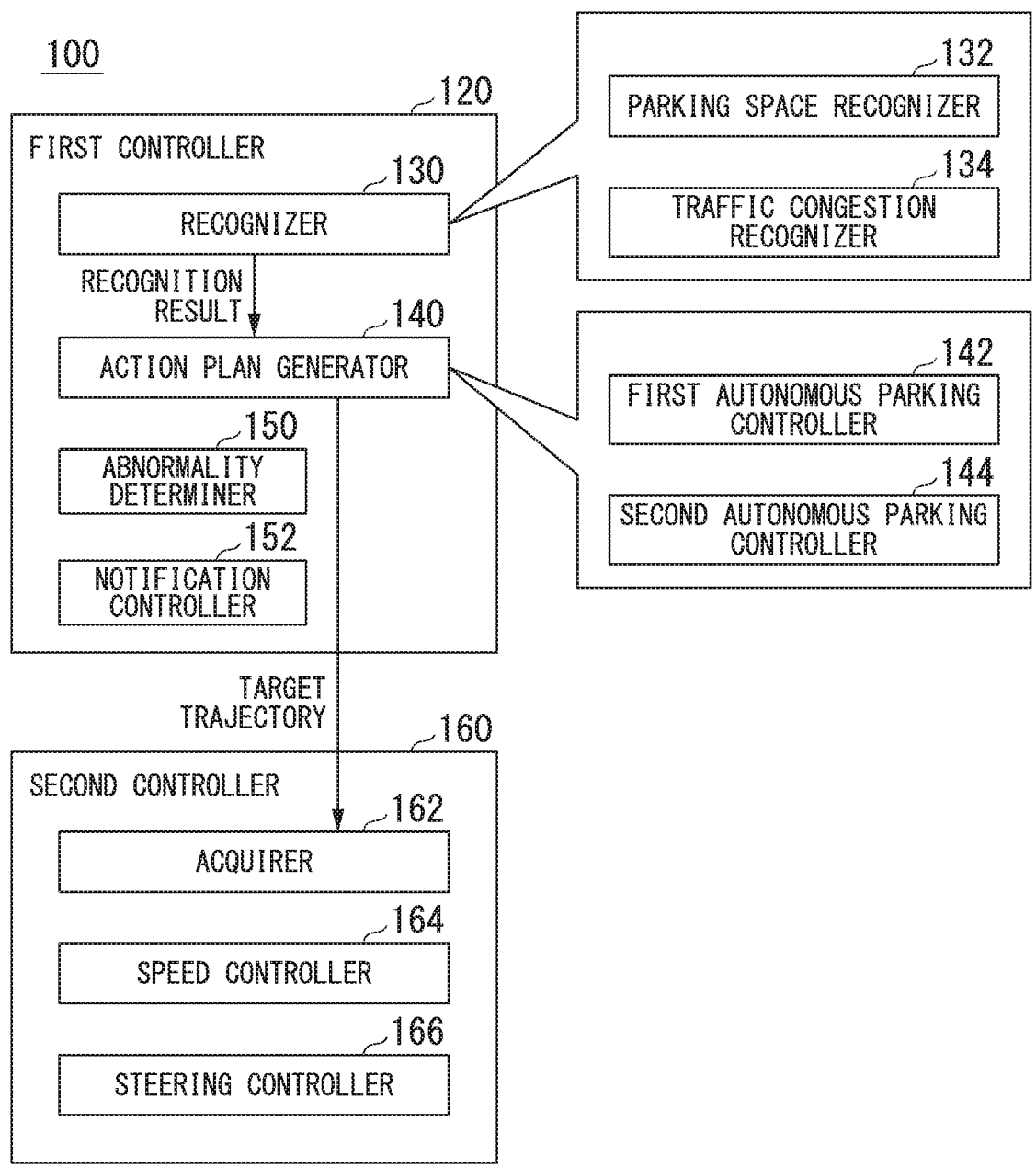
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, an abnormality determiner 150, and a notification controller 152. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured.

The recognizer 130 recognizes a state such as a position, velocity, or acceleration of a physical object present in the vicinity of the host vehicle M on the basis of information input from the outside-vehicle camera 10, the radar device 12, and the finder 14 via the object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the outside-vehicle camera 10. The recognizer 130 may recognize a travel lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the travel lane is recognized, the recognizer 130 recognizes a position or orientation of the host vehicle M with respect to the travel lane. For example, the recognizer 130 may recognize a gap of a reference point of the host vehicle M from the center of the lane and an angle formed with respect to a line connecting the center of the lane in the travel direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The recognizer 130 includes, for example, a parking space recognizer 132 and a traffic congestion recognizer 134. These components are activated in an autonomous parking event to be described below. Details thereof will be described below.

The action plan generator 140 generates a future target trajectory along which the host vehicle M automatedly travels (independently of an operation of a driver) so that the host vehicle M can generally travel in the recommended lane determined by the recommended lane determiner 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each predetermined traveling distance (for example, about several meters [m]) along a road. In addition, a target speed and target acceleration for each predetermined sampling time (for example, about several tenths of a second [sec]) are generated as parts of the target trajectory. The trajectory point may be a position at which the host vehicle M is required to arrive at the sampling time for each predetermined sampling time. In this case, information about the target speed or the target acceleration is represented by an interval between the trajectory points.

The action plan generator 140 may set an automated driving event when the target trajectory is generated. Automated driving events include a constant-speed traveling event, a low-speed following event, a lane change event, a branching event, a merging event, a takeover event, an autonomous parking event in which a vehicle is parked according to unmanned traveling in valet parking or the like, and the like. The action plan generator 140 generates a target trajectory according to an activated event.

Among autonomous parking events, an event in which automated parking or automated exiting is performed in accordance with the guidance of the parking lot management device 400 will be hereinafter referred to as a first autonomous parking event. The automated parking is an operation until the vehicle is parked in the parking space after the vehicle enters a parking lot according to automated driving based on guidance. The automated exiting is an operation until the vehicle is parked in an area where an occupant is allowed to get into the vehicle (for example, the stopping area 310) after the vehicle exits from the parking lot according to the automated driving based on the guidance. In the automated driving based on the guidance, for example, the host vehicle M moves along a route according to the guidance of the parking lot management device 400 while performing sensing on its own.

On the other hand, an event in which automated parking or automated exiting is performed independently of the guidance of the parking lot management device 400 will be hereinafter referred to as a second autonomous parking event. In the automated parking or automated exiting of the second autonomous parking event, for example, the host vehicle M finds an empty parking space, a gate of the parking lot PA, or the like on its own on the basis of a detection result of the outside-vehicle camera 10, the radar device 12, the finder 14, or the object recognition device 16 independently of communication and the host vehicle M is allowed to be parked within the found parking space or allowed to travel toward the found gate. Such parking and exiting are executed by setting the driving mode to an automated driving mode.

The host vehicle M may be operated in accordance with a manual operation of the occupant without being limited thereto. In this case, parking or exiting is executed by setting the driving mode to the manual driving mode.

The action plan generator 140 includes a first autonomous parking controller 142 that is activated when the first autonomous parking event is executed and a second autonomous parking controller 144 that is activated when the second autonomous parking event is executed. Details of the functions of these components will be described below.

The second controller 160 controls the travel driving force output device 200, the brake device 210, and the steering device 220 so that the host vehicle M passes along the target trajectory generated by the action plan generator 140 at a scheduled time.

The second controller 160 includes, for example, an acquirer 162, a speed controller 164, and a steering controller 166. The acquirer 162 acquires information of a target trajectory (trajectory points) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a degree of curve of a target trajectory stored in the memory. For example, processes of the speed controller 164 and the steering controller 166 are implemented by a combination of feed-forward control and feedback control. As one example, the steering controller 166 executes feed-forward control according to the curvature of the road in front of the host vehicle M and feedback control based on a deviation from the target trajectory in combination.

The travel driving force output device 200 outputs a travel driving force (torque) for driving the vehicle to the drive wheels. The travel driving force output device 200 includes, for example, a combination of an internal combustion engine, an electric motor, a transmission, and the like, and an electronic control unit (ECU) that controls these components. The ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated by an operation of the brake pedal included in the driving operator 80 to the cylinder via a master cylinder as a backup. Also, the brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor to change the direction of the steerable wheels in accordance with the information input from the second controller 160 or the information input from the driving operator 80.

Autonomous Parking Event—When Entering is Performed

Figure 3:
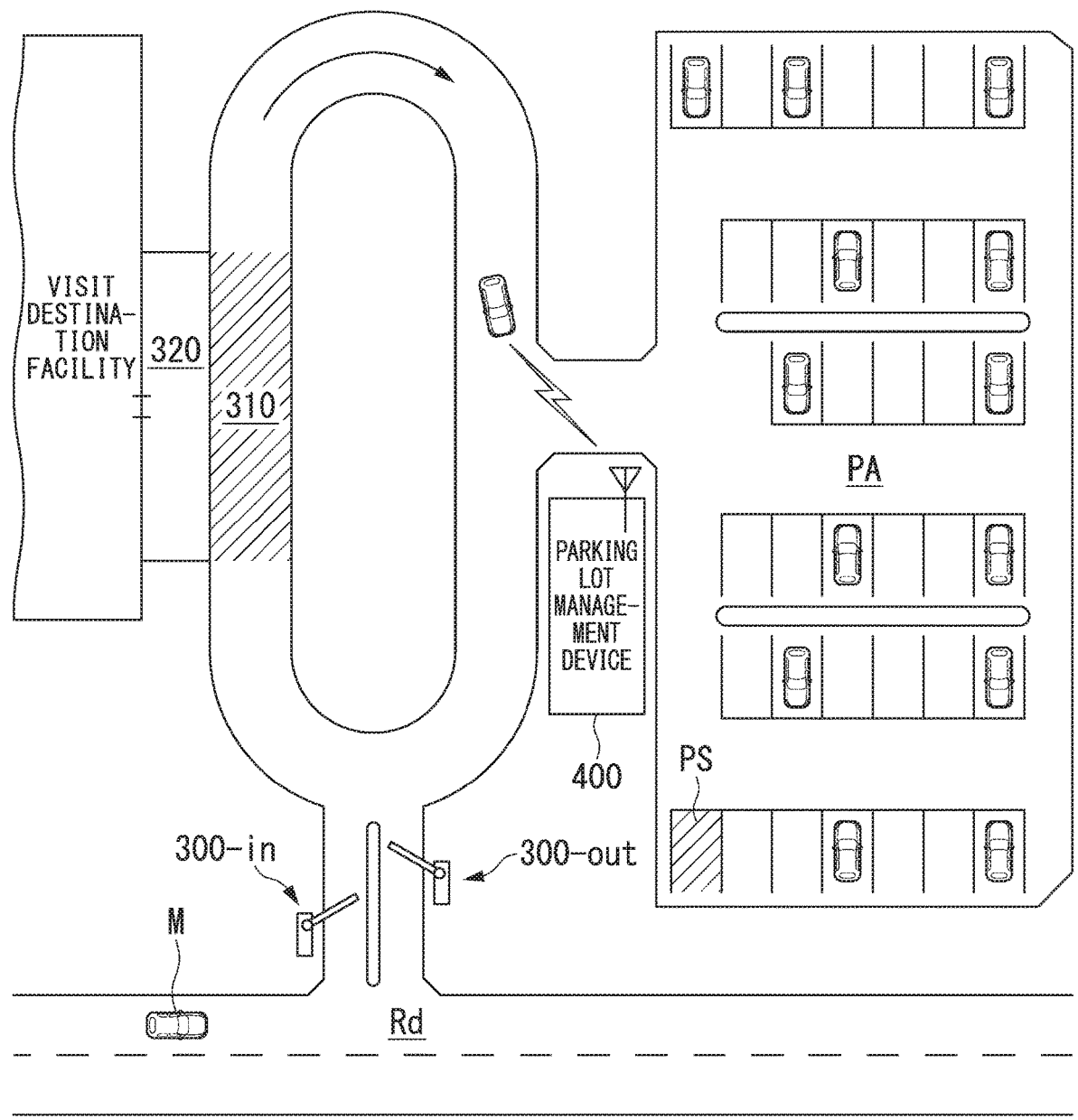
FIG. 3 is a diagram schematically showing a scene in which an autonomous parking event is executed.

For example, the first autonomous parking controller 142 causes the host vehicle M to be parked within the parking space on the basis of information acquired from the parking lot management device 400 by means of the communication device 20. FIG. 3 is a diagram schematically showing a scene in which a first autonomous parking event is executed. Gates 300-in and 300-out are provided on a route from a road Rd to a visit destination facility. The host vehicle M travels to the stopping area 310 through the gate 300-in according to manual driving or automated driving. The stopping area 310 faces a getting-into/out area 320 connected to the visit destination facility. The getting-into/out area 320 is provided with eaves for avoiding rain and snow.

After an occupant gets out of the host vehicle M in the stopping area 310, the host vehicle M performs automated driving in an unmanned manner and starts the first autonomous parking event in which the host vehicle M moves to the parking space PS within the parking lot PA. For example, a start trigger of the first autonomous parking event may be any operation of the occupant using the HMI 30 or may be a predetermined signal wirelessly received from the parking lot management device 400. For example, when a request of automated parking has been accepted from the user of the host vehicle M using the HMI 30, the host vehicle M starts the first autonomous parking event and the parking lot management device 400 performs guidance for causing automated parking to be performed. The request of automated parking may be accepted using the terminal device of the user of the host vehicle M without being limited thereto. In this case, the parking lot management device 400 instructs the host vehicle M to start the first autonomous parking event on the basis of information received from the terminal device and performs guidance for causing automated parking to be performed.

When the first autonomous parking controller 142 starts the first autonomous parking event, the first autonomous parking controller 142 controls the communication device 20 so that the communication device 20 transmits a parking request to the parking lot management device 400. The host vehicle M moves from the stopping area 310 to the parking lot PA while performing sensing on its own in accordance with the guidance of the parking lot management device 400. For example, a route to a target parking position is indicated by the parking lot management device 400 and the host vehicle M travels along the route indicated by the parking lot management device 400 while performing sensing on its own.

Figure 4:
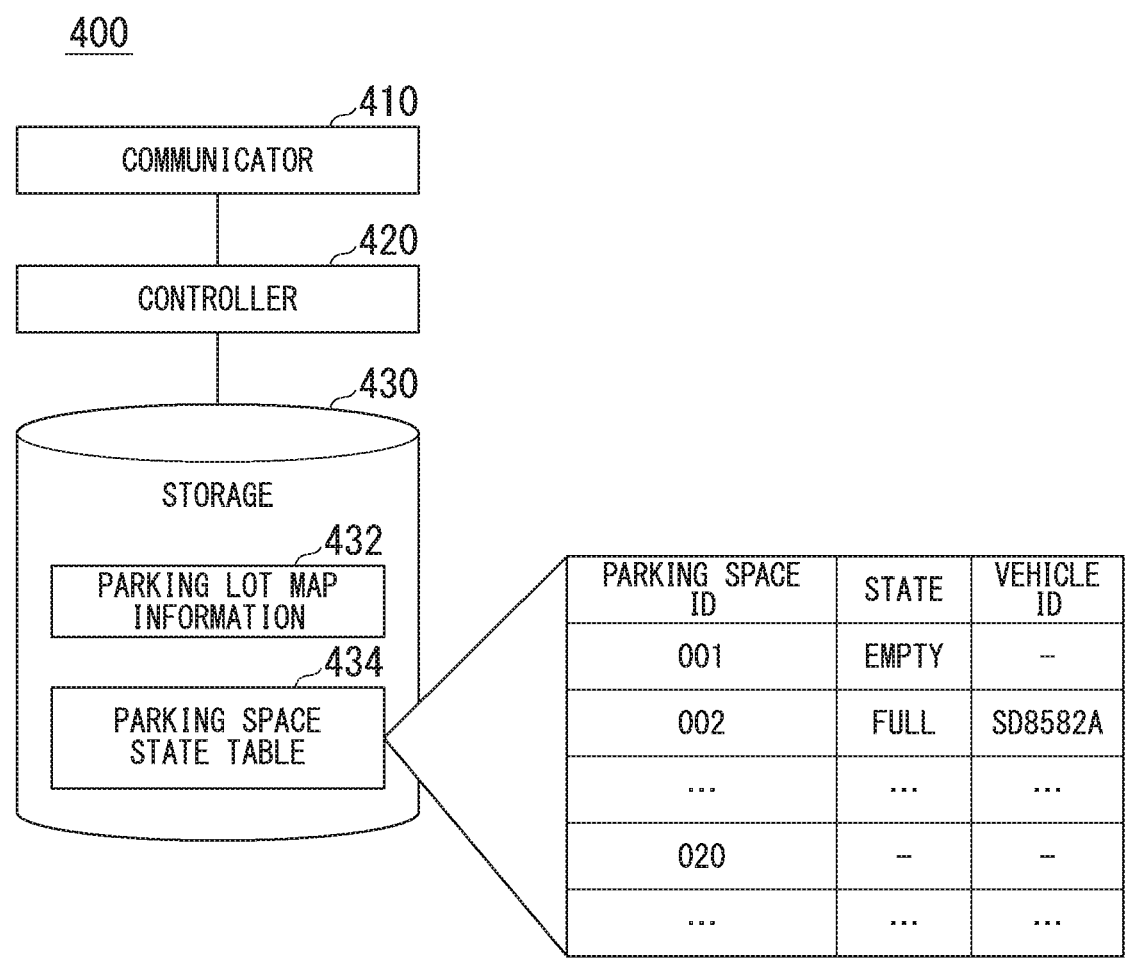
FIG. 4 is a diagram showing an example of a configuration of a parking lot management device.

FIG. 4 is a diagram showing an example of a configuration of the parking lot management device 400. The parking lot management device 400 includes, for example, a communicator 410, a controller 420, and a storage 430. The storage 430 stores information such as parking lot map information 432 and a parking space state table 434.

The communicator 410 wirelessly communicates with the host vehicle M and other vehicles. The controller 420 guides the vehicle to a parking space PS on the basis of the information acquired by the communicator 410 and the information stored in storage 430. The parking lot map information 432 is information geometrically representing the structure of the parking lot PA. The parking lot map information 432 includes coordinates for each parking space PS. In the parking space state table 434, for example, a state which is an empty state or a full (parked) state and a vehicle ID which is identification information of a parked vehicle in the case of the full state are associated with a parking space ID which is identification information of the parking space PS.

When the communicator 410 receives a parking request from the vehicle, the controller 420 extracts a parking space PS whose state is an empty state with reference to the parking space state table 434, acquires a position of the extracted parking space PS from the parking lot map information 432, and transmits a suitable route to the acquired position of the parking space PS to the vehicle using the communicator 410. The controller 420 instructs a specific vehicle to stop or slow down as necessary on the basis of a positional relationship of a plurality of vehicles so that the vehicles do not move to the same position at the same time.

In the vehicle receiving the route (hereinafter referred to as the host vehicle M), the first autonomous parking controller 142 generates a target trajectory based on the route. When the host vehicle M approaches the target parking space PS, the parking space recognizer 132 recognizes parking slot lines that partition the parking space PS and the like, recognizes a detailed position of the parking space PS, and provides the recognized position to the first autonomous parking controller 142. The first autonomous parking controller 142 receives the provided position to correct the target trajectory and cause the host vehicle M to be parked in the parking space PS.

Autonomous Parking Event—When Exiting is Performed

The first autonomous parking controller 142 and the communication device 20 also maintain the operating state when the host vehicle M is parked. The first autonomous parking controller 142 causes the system of the host vehicle M to be activated and causes the host vehicle M to move to the stopping area 310, for example, when the communication device 20 has received a pick-up request from the terminal device of the user. At this time, the first autonomous parking controller 142 controls the communication device 20 so that the communication device 20 transmits a departure request to the parking lot management device 400. The controller 420 of the parking lot management device 400 instructs a specific vehicle to stop or slow down as necessary on the basis of a positional relationship of a plurality of vehicles so that the vehicles do not move to the same position at the same time as in the entering process. When the host vehicle M is moved to the stopping area 310 and the occupant is allowed to get into the host vehicle M, the first autonomous parking controller 142 stops the operation and the manual driving or the automated driving by another functional unit is subsequently started.

Autonomous Parking Event—When Abnormality Occurs

The abnormality determiner 150 determines whether or not there is an abnormality in the parking lot management device 400 related to a function of guiding the vehicle. Hereinafter, an abnormality in the parking lot management device 400 related to the function of guiding the vehicle will be simply referred to as an abnormality in the parking lot management device 400. For example, when communication with the parking lot management device 400 is not possible, the abnormality determiner 150 determines that an abnormality has occurred in the parking lot management device 400. In a state in which communication with the parking lot management device 400 is not possible, for example, a case in which an instruction of guidance of the parking lot management device 400 has not been received for a fixed time period or more during automated parking or automated exiting, a case in which a response cannot be received even though a fixed time period has elapsed after a request was transmitted to the parking lot management device 400, and the like are included. For example, a power failure of the parking lot management device 400, a lightning strike on the parking lot management device 400, and the like are considered as causes that make communication impossible.

The abnormality determiner 150 determines that an abnormality has occurred in the parking lot management device 400 when the parking lot management device 400 cannot guide the vehicle in a state in which communication with the parking lot management device 400 is possible. For example, the abnormality determiner 150 receives information indicating a state in which the vehicle cannot be guided from the parking lot management device 400. The state in which the parking lot management device 400 cannot guide the vehicle includes, for example, a case in which a camera or a lighting device installed within the parking lot PA has failed and the like. In this manner, when the camera or the lighting device within the parking lot PA has failed, the state within the parking lot PA cannot be sufficiently recognized on the basis of the captured image of the camera and the process for guiding the vehicle cannot be executed by the parking lot management device 400.

When the abnormality determiner 150 determines that an abnormality has occurred in the parking lot management device 400, the second autonomous parking controller 144 restricts control for automated parking and automated exiting of the host vehicle M in restriction details according to a traveling state of the host vehicle M. The traveling state of the host vehicle M includes, for example, a state (A) before the host vehicle M enters the parking lot, a state (B) in which automated parking based on guidance is in progress, a state (C) in which the host vehicle M is on standby after parking, a state (D) in which automated exiting based on guidance is in progress, and the like.

When the abnormality determiner 150 determines that an abnormality has occurred in the parking lot management device 400, the second autonomous parking controller 144 performs control for causing the host vehicle M to travel independently of guidance of the parking lot management device 400 in control details according to the traveling state of the host vehicle M. That is, this control restricts the execution of the first autonomous parking event and may be one of restrictions on control for automated parking and automated exiting of the host vehicle M.

The state (A) before the host vehicle M enters the parking lot is a state before the parking lot management device 400 accepts a request of automated parking from the user and is a state in which the automated parking based on the guidance of the parking lot management device 400 is not executed. When it is determined that an abnormality has occurred in the parking lot management device 400 in the state (A) before the host vehicle M enters the parking lot, the second autonomous parking controller 144 restricts the acceptance of the request of automated parking from the user of the host vehicle M. For example, in a scene in which the user requests the automated parking using the HMI 30, the second autonomous parking controller 144 instructs the HMI 30 not to accept the request of automated parking. Thereby, the HMI 30 displays that the request of automated parking has not been accepted and invalidates the operation of the operation unit that accepts the request of automated parking. For example, when the automated parking is requested using the terminal device of the user, the second autonomous parking controller 144 may transmit information for instructing the terminal device of the user not to accept the request of automated parking using the communication device 20. As in the HMI 30, the terminal device of the user also does not accept the request.

Furthermore, the second autonomous parking controller 144 performs control for causing the host vehicle M to be parked in an empty parking space independently of the guidance of the parking lot management device 400. The control for causing the host vehicle M to be parked in the parking space independently of the guidance of the parking lot management device 400 includes, for example, a process of performing control for enabling the host vehicle M to perform the automated parking in an independent manner independently of the guidance of the parking lot management device 400. For example, the second autonomous parking controller 144 switches the driving mode to the automated driving mode, determines an empty parking space on the basis of the recognition result of the recognizer 130 independently of the guidance of the parking lot management device 400, and causes the host vehicle M to be parked in the determined parking space while performing sensing on its own.

The second autonomous parking controller 144 may switch the driving mode to the manual driving mode, for example, as control for causing the host vehicle M to be parked in the parking space independently of the guidance of the parking lot management device 400 without being limited thereto. Thereby, the host vehicle M can perform manual driving.

The state (B) in which automated parking based on guidance is in progress is a state after the parking lot management device 400 receives the request of automated parking from the user and is a state in which the automated parking is being executed in the first autonomous parking event. When it is determined that an abnormality has occurred in the parking lot management device 400 in the state (B) in which automated parking based on guidance is in progress, the second autonomous parking controller 144 stops the automated parking based on the guidance of the parking lot management device 400 and causes the host vehicle M to be parked in an evacuation space while performing sensing on its own independently of the guidance of the guidance of the parking lot management device 400. The evacuation space will be described below. For example, the first autonomous parking controller 142 ends the first autonomous parking event and the second autonomous parking controller 144 starts the second autonomous parking event. For example, the second autonomous parking controller 144 finds the evacuation space on its own on the basis of a detection result of the outside-vehicle camera 10, the radar device 12, the finder 14, or the object recognition device 16 independently of the guidance of the parking lot management device 400 and causes the host vehicle M to be automatedly parked within the found evacuation space.

When it is determined that an abnormality has occurred in the parking lot management device 400 during the automated parking based on the guidance, the second autonomous parking controller 144 may restrict the acceptance of a request of automated exiting from the user of the host vehicle M.

When it is determined that an abnormality has occurred in the parking lot management device 400 during the automated parking based on the guidance, the second autonomous parking controller 144 may perform control for causing the host vehicle M to be parked in the parking space independently of the guidance of the parking lot management device 400. The control for causing the host vehicle M to be parked in the parking space independently of the guidance of the parking lot management device 400 includes, for example, a process of performing control for enabling the host vehicle M to perform the automated parking in an independent manner independently of the guidance of the parking lot management device 400. For example, the second autonomous parking controller 144 switches the driving mode to the automated driving mode, determines an empty parking space on the basis of a recognition result of the recognizer 130 independently of the guidance of the parking lot management device 400, and causes the host vehicle M to be parked in the determined parking space while performing sensing on its own. For example, the second autonomous parking controller 144 may switch the driving mode to the manual driving mode as control for causing the host vehicle M to be parked in the parking space independently of the guidance of the parking lot management device 400. Thereby, the host vehicle M can perform manual driving.

The state (C) in which the host vehicle M is on standby after parking is a state in which the host vehicle M is parked in the parking space PS according to the automated parking based on the guidance of the parking lot management device 400 and is a state in which the first autonomous parking event is being executed. When it is determined that an abnormality has occurred in the parking lot management device 400 in the state (C) in which the host vehicle M is on standby after parking, the second autonomous parking controller 144 restricts the acceptance of the request of automated exiting from the user of the host vehicle M. For example, in a scene in which the user requests the automated exiting using the HMI 30, the second autonomous parking controller 144 instructs the HMI 30 not to accept the request of automated exiting. For example, when the automated exiting is requested using the terminal device of the user, the second autonomous parking controller 144 may transmit information for instructing the terminal device of the user not to accept the request of automated exiting using the communication device 20.

Furthermore, the second autonomous parking controller 144 performs control for causing the host vehicle M to exit from the parking space so that the host vehicle M goes to the stopping area 310 independently of guidance of the parking lot management device 400. The control for enabling the parking lot management device 400 to cause the host vehicle M to exit from the parking space so that the host vehicle M goes to the stopping area 310 independently of the guidance includes, for example, a process of performing the control for causing the host vehicle M to perform the automated exiting in an independent manner independently of the guidance of the parking lot management device 400. For example, the second autonomous parking controller 144 switches the driving mode to the automated driving mode, determines a route to the stopping area 310 on the basis of a recognition result of the recognizer 130 independently of the guidance of the parking lot management device 400, and causes the host vehicle M to travel along the determined route while performing sensing on its own.

For example, the second autonomous parking controller 144 may switch the driving mode to the manual driving mode as the control for causing the host vehicle M to exit from the parking space so that the host vehicle M goes to the stopping area 310 independently of the guidance of the parking lot management device 400 without being limited thereto. Thereby, the host vehicle M can perform manual driving.

The state (D) in which automated exiting based on guidance is in progress is a state after the parking lot management device 400 accepts a request of automated exiting from the user and is a state in which the automated exiting based on the guidance of the parking lot management device 400 is being executed. When it is determined that an abnormality has occurred in the parking lot management device 400 in the state (D) in which automated exiting based on guidance is in progress, the second autonomous parking controller 144 stops the automated exiting based on the guidance of the parking lot management device 400 and causes the host vehicle M to be parked in an evacuation space while performing sensing on its own independently of the guidance of the parking lot management device 400.

The second autonomous parking controller 144 determines, for example, an empty parking space nearest to a current position of the host vehicle M as the evacuation space. For example, the second autonomous parking controller 144 may determine an empty road shoulder space nearest to the current position of the host vehicle M as the evacuation space without being limited thereto. The road shoulder space is a space at the end of a road (a lane through which vehicles pass) within the parking lot.

When it is determined that an abnormality has occurred in the parking lot management device 400 during the automated exiting based on the guidance, the second autonomous parking controller 144 restricts the acceptance of a request of automated exiting from the user of the host vehicle M.

When it is determined that an abnormality has occurred in the parking lot management device 400 during the automated exiting based on the guidance, the second autonomous parking controller 144 performs control for causing the host vehicle M to exit from the parking space so that the host vehicle M goes to the stopping area 310 independently of the guidance of the parking lot management device 400. For example, the control for causing the host vehicle M to exit from the parking space so that the host vehicle M goes to the stopping area 310 independently of the guidance of the parking lot management device 400 includes control for causing the host vehicle M to independently perform automated exiting independently of the guidance of the parking lot management device 400. For example, the second autonomous parking controller 144 switches the driving mode to the automated driving mode, determines a route to the stopping area 310 on the basis of a recognition result of the recognizer 130 independently of the guidance of the parking lot management device 400, and causes the host vehicle M to travel along the determined route while performing sensing on its own.

For example, when it is determined that an abnormality has occurred in the parking lot management device 400 during the automated exiting based on the guidance, the second autonomous parking controller 144 may switch the driving mode to the manual driving mode as the control for causing the host vehicle M to exit from the parking space so that the host vehicle M goes to the stopping area 310 independently of the guidance of the parking lot management device 400 without being limited thereto. Thereby, the host vehicle M can perform manual driving.

When the traffic congestion recognizer 134 recognizes that traffic congestion has occurred in front of the host vehicle M, the second autonomous parking controller 144 may determine an evacuation space in an area away from the area where the traffic congestion has occurred. When communication with the parking lot management device 400 is possible, a notification of the fact that traffic congestion has occurred in front of the host vehicle M may be provided from the parking lot management device 400 with which communication is possible. In this case, for example, the parking lot management device 400 derives a density for each target area on the basis of positions and the number of vehicles within the parking lot PA, determines that traffic congestion has occurred in a target area when the density is greater than or equal to a threshold value, and notifies each vehicle of a determination result.

For example, when the traffic congestion recognizer 134 recognizes another vehicle whose average speed is less than or equal to a predetermined speed in front of the host vehicle M, the traffic congestion recognizer 134 recognizes that traffic congestion has occurred in front of the host vehicle M.

The notification controller 152 control an output so that the output notifies the user of a restriction when control for automated parking and automated exiting of the host vehicle M is restricted. For example, the notification controller 152 causes the notification of the restriction to be output to the interior of the vehicle through a sound or an image using the HMI 30. The notification controller 152 may notify the user of the restriction by transmitting information indicating the restriction to the terminal device of the user using the communication device 20 without being limited thereto. Details of the notification of the user are determined by the second autonomous parking controller 144 in accordance with restriction details according to a traveling state of the host vehicle M.

Autonomous Parking Event—When Abnormality is Eliminated

The abnormality determiner 150 determines that the abnormality occurring in the parking lot management device 400 has been eliminated when the state is switched from a state in which the communication with the parking lot management device 400 is not possible to a state in which the communication with the parking lot management device 400 is possible. The state in which the communication with the parking lot management device 400 is possible includes a case in which an instruction of guidance of the parking lot management device 400 has been received, a case in which a response has been received within a fixed time period after the transmission of a request to the parking lot management device 400, and the like.

The abnormality determiner 150 determines that the abnormality occurring in the parking lot management device 400 has been eliminated when the state has been switched from a state in which the parking lot management device 400 cannot guide the vehicle to a state in which the parking lot management device 400 can guide the vehicle. For example, the abnormality determiner 150 receives information indicating whether or not the vehicle can be guided from the parking lot management device 400. A case in which the parking lot management device 400 can guide the vehicle includes, for example, a case in which a failure of a camera or a light installed within the parking lot has been corrected and the like.

When the abnormality determiner 150 determines that the abnormality occurring in the parking lot management device 400 has been eliminated, the second autonomous parking controller 144 cancels the restricted control for automated parking and automated exiting of the host vehicle M.

When it is determined that the abnormality occurring in the parking lot management device 400 has been eliminated in a state (A') before the host vehicle M enters the parking lot, the second autonomous parking controller 144 enables a request of automated parking from the user of the host vehicle M to be accepted. When the request of automated parking has been accepted, the first autonomous parking controller 142 starts control for automated parking.

When it is determined that the abnormality occurring in the parking lot management device 400 has been eliminated in a state (B') in which the host vehicle M is performing automated parking in an independent manner, the first autonomous parking controller 142 starts the first autonomous parking event and performs control for automated parking in accordance with the guidance of the parking lot management device 400.

When it is determined that the abnormality occurring in the parking lot management device 400 has been eliminated in a state (C') in which the host vehicle M is on standby after parking, the second autonomous parking controller 144 can accept the request of automated exiting from the user of the host vehicle M. When the request of automated exiting has been accepted, the first autonomous parking controller 142 starts the first autonomous parking event and performs control for the automated exiting in accordance with the guidance of the parking lot management device 400.

When it is determined that the abnormality occurring in the parking lot management device 400 has been eliminated in a state (D') in which the vehicle is performing automated exiting in an independent manner, the first autonomous parking controller 142 starts the first autonomous parking event and performs control for automated exiting in accordance with the guidance of the parking lot management device 400.

The notification controller 152 controls the output to notify the user of restriction cancellation when the restriction on the control for the automated parking and the automated exiting of the host vehicle M by the second autonomous parking controller 144 is cancelled. For example, the notification controller 152 causes the notification of the restriction cancellation to be output to the interior of the vehicle by sound or image using the HMI 30. The notification controller 152 may notify the user of the restriction cancellation by transmitting information indicating the restriction cancellation to the terminal device of the user using the communication device 20.

Process Flow

Figure 5:
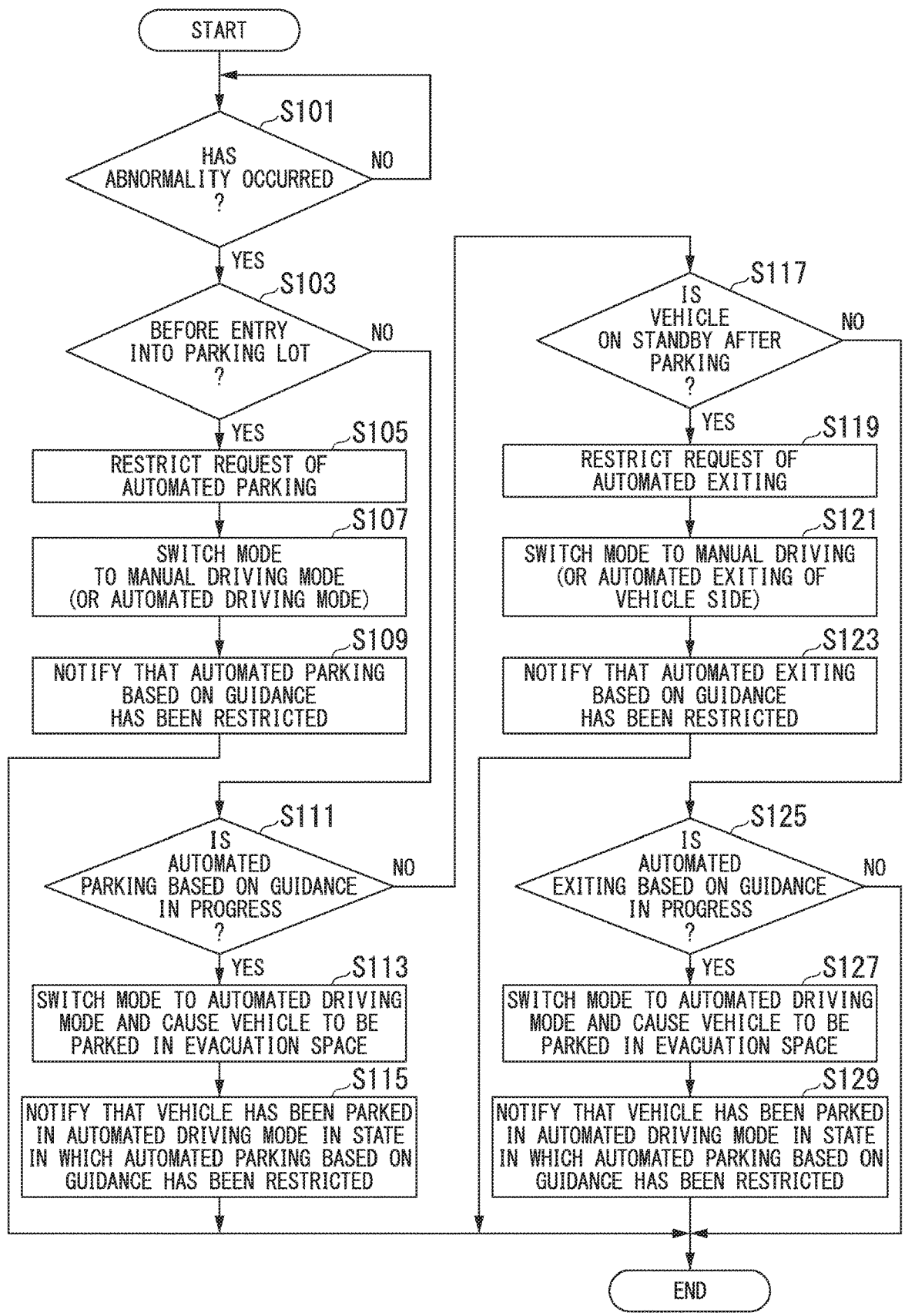
FIG. 5 is a flowchart showing an example of a process of a vehicle side when an abnormality has occurred in the parking lot management device.

FIG. 5 is a flowchart showing an example of a process of the vehicle side when an abnormality has occurred in the parking lot management device 400. When the abnormality determiner 150 determines that an abnormality has occurred in the parking lot management device 400 (step S101), the automated driving control device 100 performs the following process.

The second autonomous parking controller 144 determines whether or not the host vehicle M has not yet entered the parking lot (step S103). For example, when the first autonomous parking controller 142 has not executed the first autonomous parking event, the second autonomous parking controller 144 determines that the host vehicle M has not yet entered the parking lot. When the host vehicle M has not yet entered the parking lot, the second autonomous parking controller 144 restricts the acceptance of a request of automated parking from the user of the host vehicle M (step S105). The second autonomous parking controller 144 instructs the first autonomous parking controller 142 to prohibit the activation of the first autonomous parking event and switches the driving mode after the arrival at the visit destination facility to the manual driving mode or the automated driving mode (step S107). The notification controller 152 notifies the user that the automated parking based on the guidance of the parking lot management device 400 has been restricted (step S109).

Thereby, it is possible to prohibit the acceptance of the request of automated parking based on the guidance of the parking lot management device 400 after the arrival at the visit destination facility and execute alternative control (manual driving or automated driving in an independent manner) when automated parking based on the guidance of the parking lot management device 400 is not possible. On the other hand, when the acceptance of the request of automated parking has not been prohibited, the request of automated parking is accepted even though the parking lot management device 400 cannot guide the vehicle. When the activation of the first autonomous parking event has not been prohibited, the host vehicle M stops moving from a place where the occupant has got out of the host vehicle M because the host vehicle M is waiting for guidance even though there is no guidance from the parking lot management device 400 and the stopping area 310 may be congested.

When the host vehicle M has not yet entered the parking lot in step S103, the second autonomous parking controller 144 determines whether or not automated parking based on the guidance of the parking lot management device 400 is in progress (step S111). When the automated parking based on the guidance of the parking lot management device 400 is in progress, the second autonomous parking controller 144 instructs the first autonomous parking controller 142 to stop control for automated parking, switches the driving mode to the automated driving mode, and causes the host vehicle M to be parked in the evacuation space (step S113). The notification controller 152 notifies the user that the mode is switched to the automated driving mode and the host vehicle M is parked in the evacuation space in a state in which the automated parking based on the guidance of the parking lot management device 400 has been restricted (step S115).

Thereby, when the automated parking based on the guidance of the parking lot management device 400 is not possible, it is also possible to cause the host vehicle M to be parked in the evacuation space. On the other hand, when the parking in the evacuation space has not been performed, the host vehicle M stops moving on a road within the parking lot because the host vehicle M is waiting for guidance even though there is no guidance from the parking lot management device 400 and the inside of the parking lot PA may be congested.

When the automated parking based on the guidance of the parking lot management device 400 is not in progress in step S111, the second autonomous parking controller 144 determines whether or not the host vehicle M is on standby after the automated parking based on the guidance of the parking lot management device 400 (step S117). When waiting after automated parking based on the guidance of the parking lot management device 400 is in progress, the second autonomous parking controller 144 restricts the acceptance of the request of automated exiting from the user of the host vehicle M (step S119). The second autonomous parking controller 144 instructs the first autonomous parking controller 142 to stop the first autonomous parking event and switches the driving mode to the manual driving mode or the automated driving mode (step S121). The notification controller 152 notifies the user that the automated parking based on the guidance of the parking lot management device 400 has been restricted (step S123).

Thereby, it is possible to prohibit the acceptance of the request of automated exiting based on the guidance of the parking lot management device 400 while the host vehicle M is on standby in the parking lot and execute alternative control (manual driving or automated driving in an independent manner) when automated exiting based on the guidance of the parking lot management device 400 is not possible. On the other hand, when the acceptance of the request of automated exiting is not prohibited, the request of automated exiting is accepted even though the parking lot management device 400 cannot guide the vehicle and the user must wait for a vehicle that does not exit.

When waiting after the automated parking based on the guidance of the parking lot management device 400 is not in progress in step S117, the second autonomous parking controller 144 determines whether or not the automated exiting based on the guidance of the parking lot management device 400 is in progress (step S125). When the automated exiting based on the guidance of the parking lot management device 400 is in progress, the second autonomous parking controller 144 instructs the first autonomous parking controller 142 to stop the control for the automated exiting, switches the driving mode to the automated driving mode, and causes the vehicle to be parked in the evacuation space (step S127). The notification controller 152 notifies the user that the vehicle is parked in the evacuation space by switching the driving mode to the automated driving mode in a state in which the automated parking based on the guidance of the parking lot management device 400 has been restricted (step S129).

Thereby, when the automated parking based on the guidance of the parking lot management device 400 is not possible, it is also possible to cause the vehicle to be parked in the evacuation space. On the other hand, when the parking in the evacuation space has not been performed, the host vehicle M stops moving on a road within the parking lot because the host vehicle M is waiting for guidance even though there is no guidance from the parking lot management device 400 and the inside of the parking lot PA may be congested.

Figure 6:
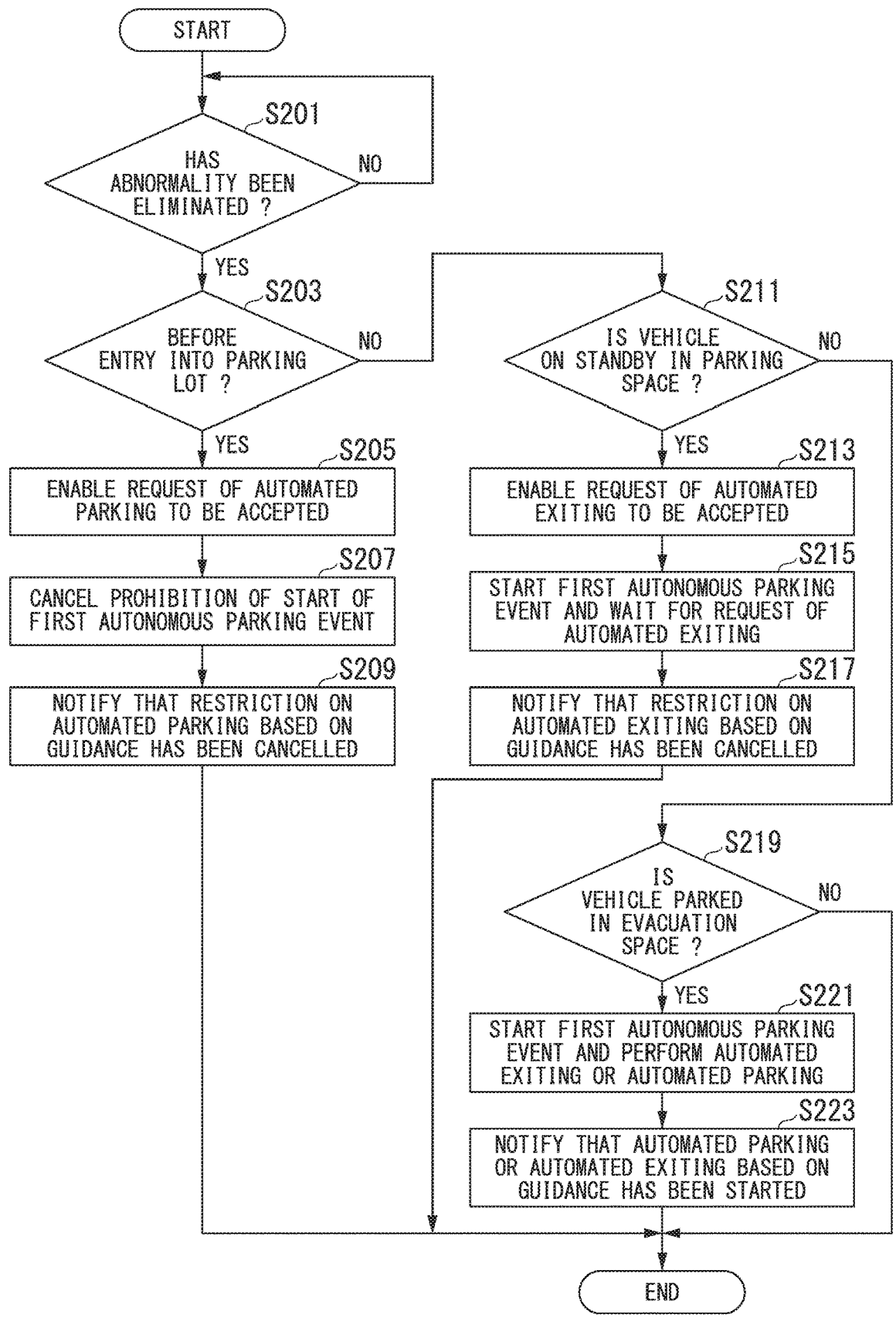
FIG. 6 is a flowchart showing an example of a process of the vehicle side when an abnormality occurring in the parking lot management device has been eliminated.

FIG. 6 is a flowchart showing an example of a process of the vehicle side when an abnormality that has occurred in the parking lot management device 400 is eliminated. When the abnormality determiner 150 determines that the abnormality occurring in the parking lot management device 400 has been eliminated (step S201), the automated driving control device 100 performs the following process.

The second autonomous parking controller 144 determines whether or not the host vehicle M has not yet entered the parking lot PA (step S203). When the host vehicle M has not yet entered the parking lot PA, the second autonomous parking controller 144 enables a request of automated parking from the user of the host vehicle M to be accepted (step S205). The second autonomous parking controller 144 cancels the prohibition of the start of the first autonomous parking event (step S207). The notification controller 152 notifies the user that the restriction on the automated parking based on the guidance of the parking lot management device 400 has been cancelled (step S209).

When the host vehicle M has entered the parking lot PA in step S203, the second autonomous parking controller 144 determines whether or not the host vehicle M is on standby in the parking space PS (step S211). When the host vehicle M is on standby in the parking space PS, the second autonomous parking controller 144 enables a request of automated exiting from the user of the host vehicle M to be accepted (step S213). The first autonomous parking controller 142 starts the first autonomous parking event and waits for the request of automated exiting (step S215). The notification controller 152 notifies the user that a restriction on the automated exiting based on the guidance of the parking lot management device 400 has been cancelled (step S217).

When the host vehicle M is not on standby in the parking space PS in step S211, the second autonomous parking controller 144 determines whether or not the host vehicle M is parked in the evacuation space (step S219). When the host vehicle M is parked in the evacuation space, the first autonomous parking controller 142 starts the first autonomous parking event and performs control for automated parking or automated exiting (step S221). The notification controller 152 notifies the user that the automated parking or the automated exiting based on the guidance of the parking lot management device 400 has been started (step S223).

Conclusion of Embodiment

As described above, the automated driving control device 100 of the present embodiment includes the communication device 20 configured to communicate with the parking lot management device 400 related to a function of guiding a vehicle; a driving controller (140 or 160) configured to perform driving control including at least one of speed control and steering control of the vehicle; and the abnormality determiner 150 configured to determine the presence or absence of an abnormality in the parking lot management device 400, wherein the driving controller performs the driving control based on guidance of the parking lot management device 400 on the basis of information received from the parking lot management device 400 by the communication device 20 and restricts the driving control based on the guidance of the parking lot management device 400 when the abnormality determiner 150 determines that the abnormality has occurred in the parking lot management device 400, so that it is possible to solve problems to be taken into account when an abnormality occurs in a device for guiding a vehicle in valet parking.

Hardware Configuration

Figure 7:
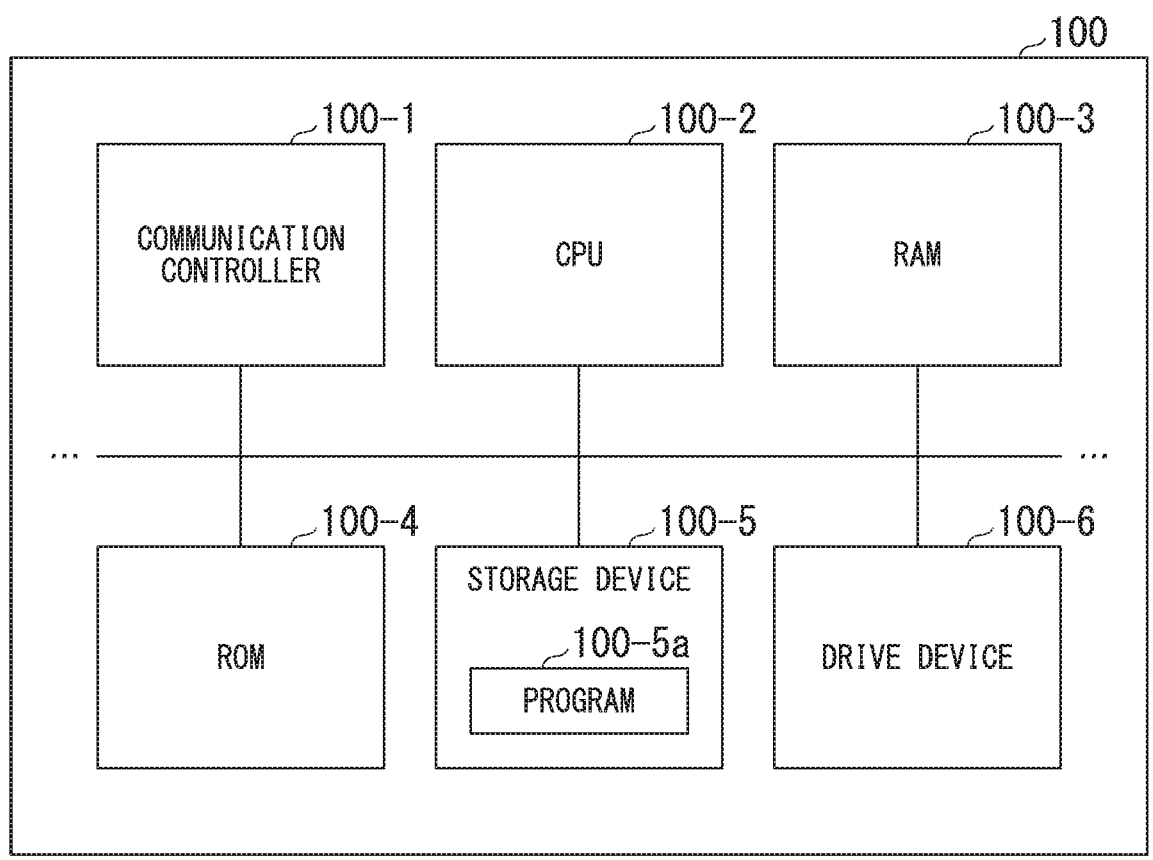
FIG. 7 is a diagram showing an example of a hardware configuration of an automated driving control device according to the embodiment.

FIG. 7 is a diagram showing an example of a hardware configuration of the automated driving control device 100 of the embodiment. As shown in FIG. 7, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. The storage device 100-5 stores a program 100-5*a* to be executed by the CPU 100-2. This program is loaded to the RAM 100-3 by a direct memory access (DMA) controller (not shown) or the like and executed by the CPU 100-2. Thereby, one or both of the first controller 120 and the second controller 160 are implemented.

The embodiment described above can be represented as a vehicle control device including: a storage device storing a program; and a hardware processor, wherein the hardware processor executes the program stored in the storage device to: communicate with the parking lot management device 400 for guiding a vehicle; perform driving control including at least one of speed control and steering control of the vehicle; determine the presence or absence of an abnormality in the parking lot management device 400; perform the driving control based on guidance of the parking lot management device 400 on the basis of information received from the parking lot management device 400; and restrict the driving control based on the guidance of the parking lot management device 400 when it is determined that the abnormality has occurred in the parking lot management device 400.

Although modes for carrying out the present invention have been described using embodiments, the present invention is not limited to the embodiments, and various modifications and substitutions can also be made without departing from the scope and spirit of the present invention.

For example, when there is no request for automated parking based on the guidance of the parking lot management device 400, the host vehicle M may find a parking space of an empty state on its own on the basis of a detection result of the outside-vehicle camera 10, the radar device 12, the finder 14, or the object recognition device 16 independently of communication and cause the host vehicle M to be parked within the found parking space.

When there is no request for automated exiting based on the guidance of the parking lot management device 400, the host vehicle M may find a route sign and the like for the stopping area 310 on its own on the basis of a detection result of the outside-vehicle camera 10, the radar device 12, the finder 14, or the object recognition device 16 independently of communication and cause the host vehicle M to perform automated exiting in accordance with the found route sign.

What is claimed is:

1. A vehicle control device comprising:
   a communicator configured to communicate with a parking lot management device having a function of guiding a vehicle;
   a driving controller configured to perform driving control including at least one of speed control and steering control of the vehicle; and
   an abnormality determiner configured to determine the presence or absence of an abnormality in the parking lot management device,
   wherein the driving controller is configured to perform the driving control based on guidance of the parking lot management device on the basis of information received by the communicator from the parking lot management device, restrict the driving control based on the guidance of the parking lot management device in a case where the abnormality determiner determines that the abnormality has occurred in the parking lot management device,
   wherein, in a case where the abnormality has occurred in the parking lot management device after the vehicle entered a parking lot managed by the parking lot management device,
   restrict acceptance of a request of automated exiting based on the guidance of the parking lot management device from a user of the vehicle during automated parking based on the guidance of the parking lot management device and to perform control for enabling the vehicle to perform the automated parking in an independent manner independently of the guidance of the parking lot management device,
   restrict the acceptance of the request of the automated exiting based on the guidance of the parking lot management device from the user of the vehicle while the vehicle is on standby in the parking lot, and
   restrict the acceptance of the request of the automated exiting based on the guidance of the parking lot management device from the user of the vehicle during the automated exiting based on the guidance of the parking lot management device and to perform control for manual driving by the user of the vehicle or control for enabling the vehicle to perform the automated exiting in the independent manner independently of the guidance of the parking lot management device.

2. The vehicle control device according to claim 1, wherein, in a case where the abnormality has occurred in the parking lot management device before the vehicle enters a parking lot managed by the parking lot management device, the driving controller is configured to restrict acceptance of a request of automated parking based on the guidance of the parking lot management device from a user of the vehicle and to perform control for manual driving by the user of the vehicle or control for enabling the vehicle to perform automated driving in an independent manner independently of the guidance of the parking lot management device.

3. The vehicle control device according to claim 1, wherein, in a case where the abnormality has occurred in the parking lot management device after the vehicle entered a parking lot managed by the parking lot management device, the driving controller is configured to restrict acceptance of a request of automated exiting based on the guidance of the parking lot management device from a user of the vehicle and to perform control for manual driving by the user of the vehicle or control for enabling the vehicle to perform automated parking or the automated exiting in an independent manner independently of the guidance of the parking lot management device.

4. The vehicle control device according to claim 1, wherein, in a case where the abnormality has occurred in the parking lot management device during automated parking or automated exiting based on the guidance of the parking lot management device, the driving controller is configured to stop the automated exiting based on the guidance of the parking lot management device and to perform control for enabling the vehicle to perform the automated parking in an independent manner independently of the guidance of the parking lot management device in an evacuation space.

5. The vehicle control device according to claim 4, wherein the driving controller is configured to determine an empty parking space nearest to the vehicle or an empty road shoulder nearest to the vehicle as the evacuation space.

6. The vehicle control device according to claim 4, wherein the driving controller is configured to determine the evacuation space in an area away from an area where traffic congestion occurs in a case where the traffic congestion occurs in the vicinity of the vehicle.

7. The vehicle control device according to claim 1, wherein the abnormality determiner is configured to determine that the abnormality has occurred in the parking lot management device in a case where the communicator is unable to communicate with the parking lot management device or in a case where the parking lot management device is unable to guide the vehicle in a state in which the communicator is able to communicate with the parking lot management device.

8. The vehicle control device according to claim 1, further comprising:
   a notification controller configured to control an output to notify a user of the vehicle of a restriction in a case where control for automated parking or automated exiting based on the guidance of the parking lot management device is restricted.

9. The vehicle control device according to claim 1, wherein the driving controller is configured to perform control for automated parking and automated exiting of the vehicle in a case where the abnormality determiner determines that the abnormality of the parking lot management device has been eliminated.

10. A vehicle control method using a vehicle computer, comprising:
    communicating with a parking lot management device for guiding a vehicle;
    performing driving control including at least one of speed control and steering control of the vehicle;
    determining the presence or absence of an abnormality in the parking lot management device;
    performing the driving control based on guidance of the parking lot management device on the basis of information received from the parking lot management device;
    restricting the driving control based on the guidance of the parking lot management device in a case where it is determined that the abnormality has occurred in the parking lot management device;

wherein, in a case where the abnormality has occurred in the parking lot management device after the vehicle entered a parking lot managed by the parking lot management device, restricting acceptance of a request of automated exiting based on the guidance of the parking lot management device from a user of the vehicle during automated parking based on the guidance of the parking lot management device and to perform control for enabling the vehicle to perform the automated parking in an independent manner independently of the guidance of the parking lot management device;

restricting the acceptance of the request of the automated exiting based on the guidance of the parking lot management device from the user of the vehicle while the vehicle is on standby in the parking lot; and restrict the acceptance of the request of the automated exiting based on the guidance of the parking lot management device from the user of the vehicle during the automated exiting based on the guidance of the parking lot management device and to perform control for manual driving by the user of the vehicle or control for enabling the vehicle to perform the automated exiting in the independent manner independently of the guidance of the parking lot management device.

11. A computer-readable non-transitory storage medium storing a program for causing a vehicle computer to:

communicate with a parking lot management device for guiding a vehicle;

perform driving control including at least one of speed control and steering control of the vehicle;

determine the presence or absence of an abnormality in the parking lot management device;

perform the driving control based on guidance of the parking lot management device on the basis of information received from the parking lot management device;

restrict the driving control based on the guidance of the parking lot management device in a case where it is determined that the abnormality has occurred in the parking lot management device;

wherein, in a case where the abnormality has occurred in the parking lot management device after the vehicle entered a parking lot managed by the parking lot management device, restrict acceptance of a request of automated exiting based on the guidance of the parking lot management device from a user of the vehicle during automated parking based on the guidance of the parking lot management device and to perform control for enabling the vehicle to perform the automated parking in an independent manner independently of the guidance of the parking lot management device, restrict the acceptance of the request of the automated exiting based on the guidance of the parking lot management device from the user of the vehicle while the vehicle is on standby in the parking lot, and restrict the acceptance of the request of the automated exiting based on the guidance of the parking lot management device from the user of the vehicle during the automated exiting based on the guidance of the parking lot management device and to perform control for manual driving by the user of the vehicle or control for enabling the vehicle to perform the automated exiting in the independent manner independently of the guidance of the parking lot management device.

* * * * *